Patented Mar. 13, 1934

1,951,298

UNITED STATES PATENT OFFICE 1,951,298

AZO DYESTUFF AND COLOR LAKES MADE THEREFROM

Hermann Wagner, Soden-on-Taunus, Germany, assignor to General Aniline Works, Inc., New York, N. Y., a corporation of Delaware No Drawing. Application August 27, 1931, Serial No. 559,809. In Germany September 2, 1930

5 Claims. (Cl. 260—91)

The present invention relates to a new azo dyestuff and to color lakes made therefrom; more particularly it relates to the mono-azo dyestuff which is obtainable by coupling diazotized 2-amino-4-sulfo-1-benzoic acid with β-naphthol and to its salts with a suitable lake forming metal such as, for instance, calcium, barium or strontium.

The preparation of the lakes may be performed according to the methods applied in the manufacture of pigment dyes. It has been found that it is essential to convert the azo dyestuff into its lakes as completely as possible, inasmuch as the presence of impurities, for instance, any non-converted azo dyestuff proper, even in small quantity, detrimentally affects the technical quality of the products.

The lakes show red tints and possess a good fastness to light.

The mono-azo-dyestuff obtainable by coupling diazotized 2-amino-4-sulfo-1-benzoic acid with β-naphthol when used in the form of its mono- or di-sodium salt is capable of dyeing wool clear orange-red tints, which turn Bordeaux-red when after-chromed.

The preparation of the said mono-azo-dyestuff is included in this invention.

The manufacture of the dyestuff and its conversion into the lakes may be performed in one single operation.

The following examples serve to illustrate the invention but are not intended to limit it thereto, the parts being by weight:

(1) 21.7 parts of 2 amino-4-sulfo-1-benzoic acid are diazotized in the usual manner and coupled in a feebly acid, neutral or feebly alkaline solution with 14.5 parts of β-naphthol. After the coupling is finished, the reaction mixture is rendered alkaline, if necessary, and the dyestuff is salted out in the form of a di-sodium salt by means of sodium chloride. The di-sodium salt is thus obtained in a nearly quantitative yield; in the dry state it is a yellowish-red powder, which dissolves in water to an orange solution. The dyestuff dyes wool clear orange-red tints which turn to Bordeaux-red when after-chromed.

(2) 41.6 parts of the di-sodium salt obtained according to the preceding example are dissolved in 750 parts of water and this solution is run at 90° C., while stirring constantly, into a solution of 22 parts of anhydrous calcium chloride and 100 parts of sodium chloride in 400 parts of water. Stirring is subsequently continued for a quarter of an hour at the same temperature. After cooling to 70° C. the calcium-lake thus formed is separated from the liquor and washed with cold water. The lake is dried at 40° C.–50° C. and is a red powder.

(3) 41.6 parts of the di-sodium salt are dissolved in 750 parts of water and this solution is run at 90° C., while stirring, into a solution of 32 parts of anhydrous strontium chloride and 100 parts of sodium chloride in 400 parts of water; stirring is subsequently continued for a quarter of an hour at the same temperature. After cooling to 70° C. the strontium lake thus formed is precipitated from the liquor and washed with cold water. The dyestuff-lake is dried at 40° C.–50° C. and is a scarlet-red powder.

(4) 41.6 parts of the di-sodium salt are dissolved in 750 parts of water and this solution is run at 90° C. while stirring into a solution of 42 parts of anhydrous barium chloride and 100 parts of sodium chloride in 400 parts of water. The temperature is maintained for a quarter of an hour while stirring is continued. After cooling to 70° C. the barium-lake thus formed is precipitated from the liquor and washed with cold water. The lake is dried at 40° C.–50° C. and is a scarlet-red powder.

(5) 21.7 parts of 2-amino-4-sulfo-1-benzoic acid are diazotized in the usual manner, except that 6.6 parts of calcium nitrite are used instead of sodium nitrite and the diazo-compound is then coupled with 14.5 parts of β-naphthol on the presence of such a quantity of milk of lime or chalk that the acid present is neutralized and the dyestuff which is formed is converted into the di-calcium salt. After the coupling is completed, the reaction mixture is warmed for a short time. The calcium lake thus formed is separated from the liquor, washed with cold water and dried at 40° C.–50° C. It is a red powder.

The new lakes may also be produced in the presence of a known distributing agent as, for instance, Turkey-red oil, as well as in the presence of substratta and at boiling temperatures or at lower temperatures.

I claim:

1. The mono-azo dyestuff and the metal salts thereof represented by the general formula:

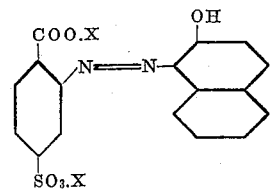

wherein the X's stand for hydrogen or an alkaline earth metal.

2. The alkaline earth metal lakes of the mono-azo dyestuff having the general formula:

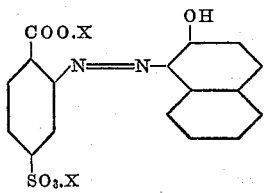

wherein the X's stand for an alkaline earth metal, said products having red tints and possessing good fastness to light.

3. The calcium lake of the mono-azo dyestuff having the formula:

said product forming a red powder when dry.

4. The strontium lake of the mono-azo dyestuff having the formula:

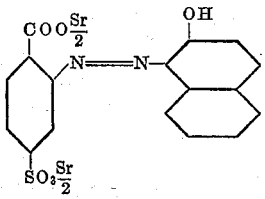

said product forming a scarlet red powder when dry.

5. The barium lake of the mono-azo dyestuff having the formula:

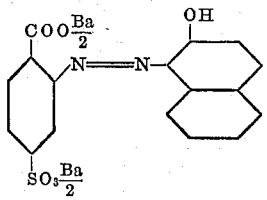

said product forming a scarlet red powder when dry.

HERMANN WAGNER.